May 16, 1944. E. RACZ Re. 22,480

PRINTING MACHINE

Original Filed Nov. 26, 1940 8 Sheets-Sheet 1

INVENTOR
Ernest Racz
BY
Davis, Hudson, Smith & Shoup.
ATTORNEYS

May 16, 1944. E. RACZ Re. 22,480

PRINTING MACHINE

Original Filed Nov. 26, 1940 8 Sheets-Sheet 2

INVENTOR
Ernest Racz
BY
Davis, Lindsey, Smith & Shmit
ATTORNEYS

May 16, 1944. E. RACZ Re. 22,480

PRINTING MACHINE

Original Filed Nov. 26, 1940 8 Sheets-Sheet 3

INVENTOR
Ernest Racz
BY
Davis, Hudson, Smith & Shoutz
ATTORNEYS

May 16, 1944. E. RACZ Re. 22,480

PRINTING MACHINE

Original Filed Nov. 26, 1940 8 Sheets-Sheet 4

INVENTOR
Ernest Racz
BY
Davis, Lindsey, Smith & Shorts,
ATTORNEYS

May 16, 1944. E. RACZ Re. 22,480

PRINTING MACHINE

Original Filed Nov. 26, 1940 8 Sheets-Sheet 5

INVENTOR
Ernest Racz
BY
Davis, Hinkley, Smith & Shorts
ATTORNEYS

May 16, 1944. E. RACZ Re. 22,480
PRINTING MACHINE
Original Filed Nov. 26, 1940 8 Sheets-Sheet 6
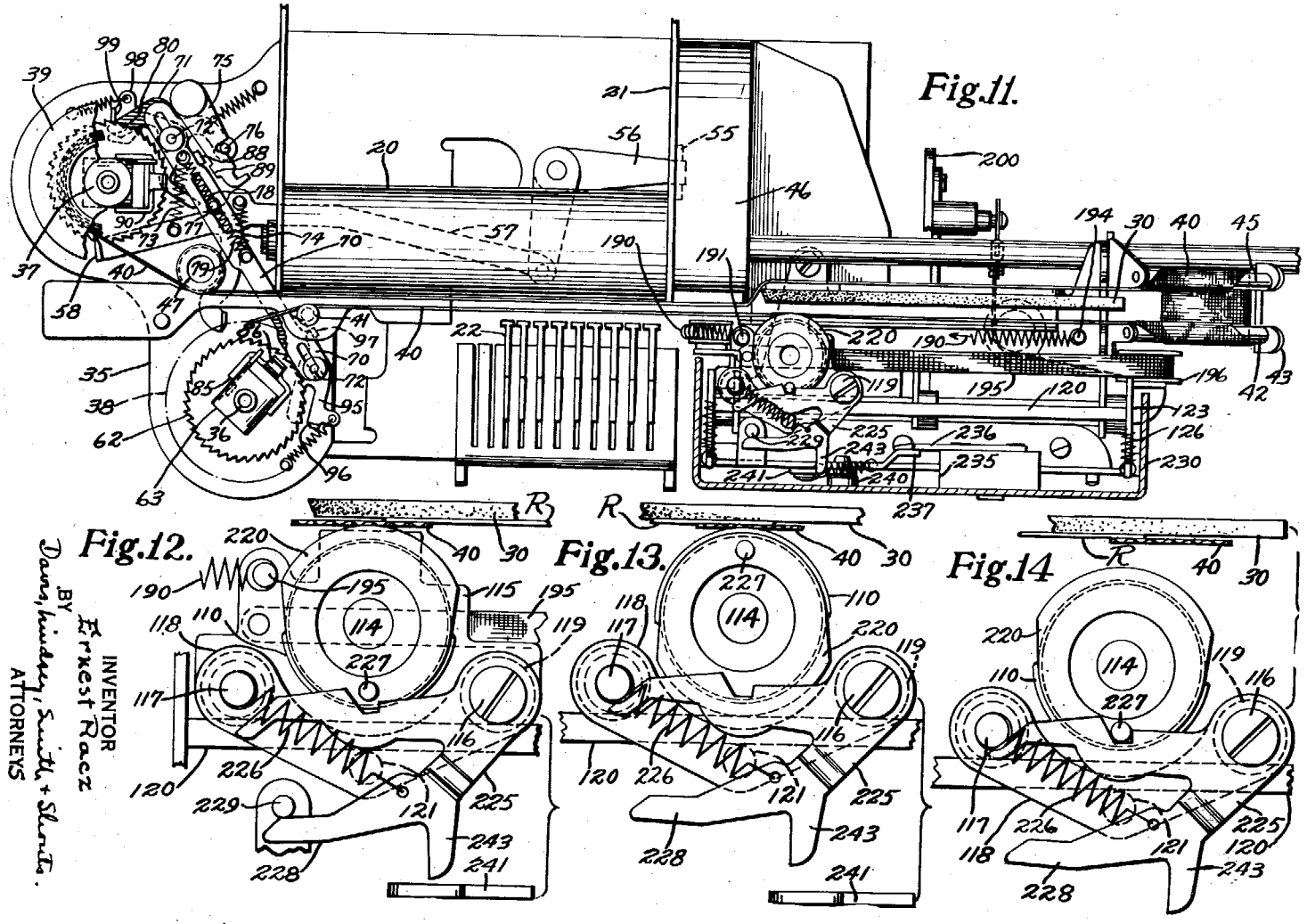
INVENTOR
Ernest Racz
BY
Davis, Hindsey, Smith + Shonts.
ATTORNEYS

PRINTING MACHINE

Original Filed Nov. 26, 1940 8 Sheets-Sheet 7

INVENTOR
Ernest Racz
BY
Davis, Hinkley, Smith + Short
ATTORNEYS

PRINTING MACHINE

Original Filed Nov. 26, 1940 8 Sheets-Sheet 8

| | | | |
|---|---|---|---|
| 5231 | JAN 10 | 58.65 | PAID John Doe Treasurer |

| | | | RECEIPT | | | |
|---|---|---|---|---|---|---|
| 1234 | FEB 15 | 100.00 | 1234 | John Doe | FEB 15 | 100.00 |
| | | | | Jack Frost | | |

| | | RECEIPT | | |
|---|---|---|---|---|
| MAR 15 40 | 65.00 | John Doe | Treas. | MAR 15 40 |
| 5678 | 65.00 | Jack Frost | Audit. | 65.00 |

INVENTOR
Ernest Racz
BY
Davis, Hinkley, Smith & Shoutz
ATTORNEYS

Reissued May 16, 1944

Re. 22,480

UNITED STATES PATENT OFFICE 22,480

PRINTING MACHINE

Ernest Racz, Detroit, Mich., assignor to Burroughs Adding Machine Company, Detroit, Mich., a corporation of Michigan Original No. 2,288,107, dated June 30, 1942, Serial No. 367,234, November 26, 1940. Application for reissue July 8, 1942, Serial No. 450,219

19 Claims. (Cl. 101—212)

This invention relates to a calculating machine. It is concerned primarily with a construction that enables a small, portable type, adding machine to be used as a signature printer or to be used not only to calculate and print the amount of a receipt such as a tax receipt but also to print a signature in such a manner and under such control that the receipt will be a valid signed receipt.

Work involving the printing of signatures on receipts generally fluctuates greatly in volume. For example, most bills, particularly tax bills, are paid within a short time of the due date and the work of issuing signed receipts for such payments is very heavy during that time but exceedingly light or non-existent during most of the time between due dates, and it is, therefore, desirable that machines to be used in making signed receipts should not be expensive, should not necessitate high equipment costs in connection with such seasonal work and should not be idle during periods when few or no signed receipts are being made. The machine should preferably be light and easily portable from a place where it may be necessary to use it in making the signed receipts to such other places where it might be advantageously usable for other purposes when not needed for making receipts.

The general object of the invention is to provide an improved calculating machine that will also print a signature on the work sheet on which entries are being made.

More particularly, the object of the invention is to adapt a small portable adding machine for signature printing.

Other and more specific objects will appear from the following specification and drawings.

An embodiment of the invention is shown in the accompanying drawings in which.

Figure 2:
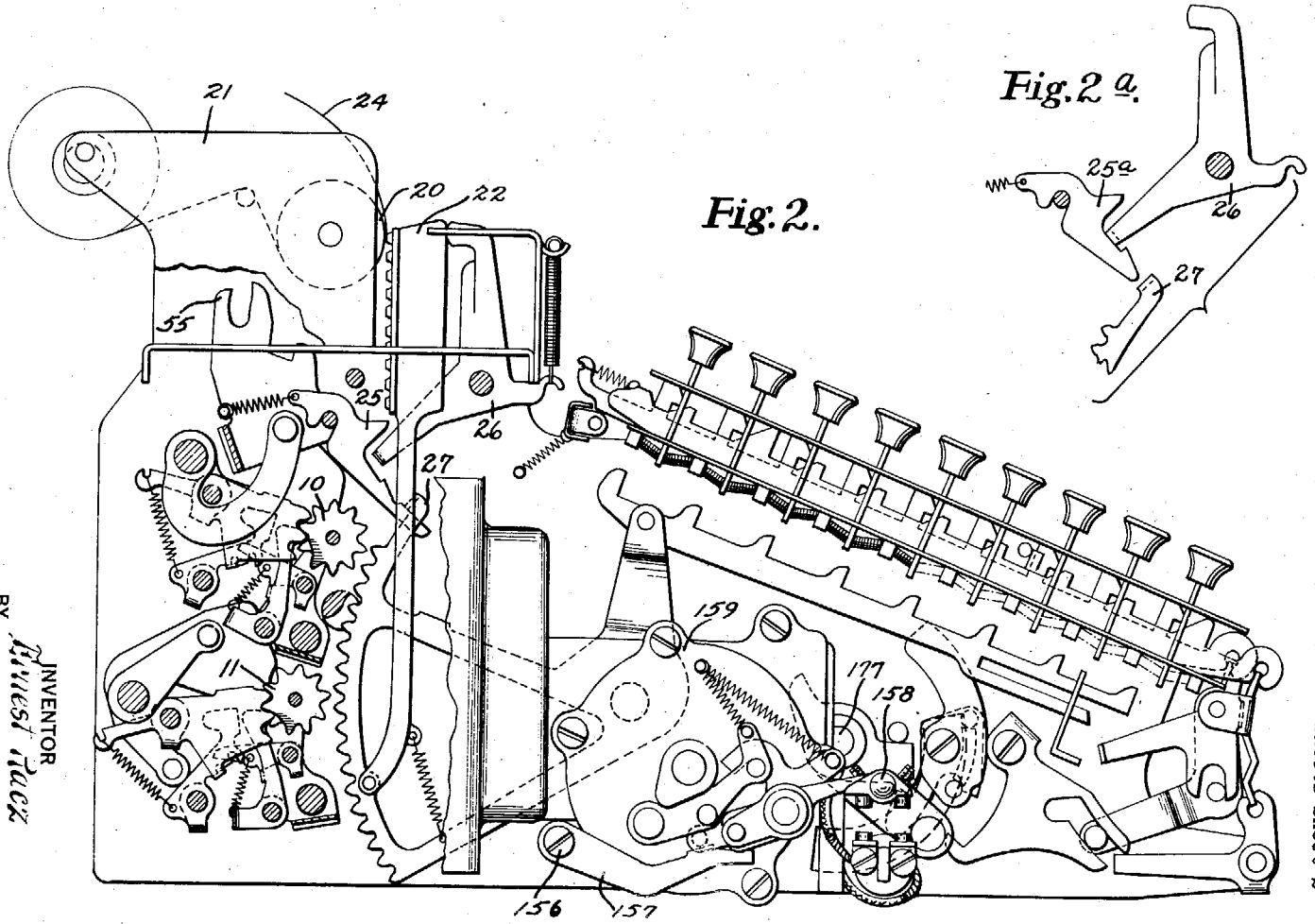
Fig. 2 is a left side elevation of said machine.

Fig. 2[a] shows a modified detail of the printing hammer control of the amount printing mechanism.

Figure 3:
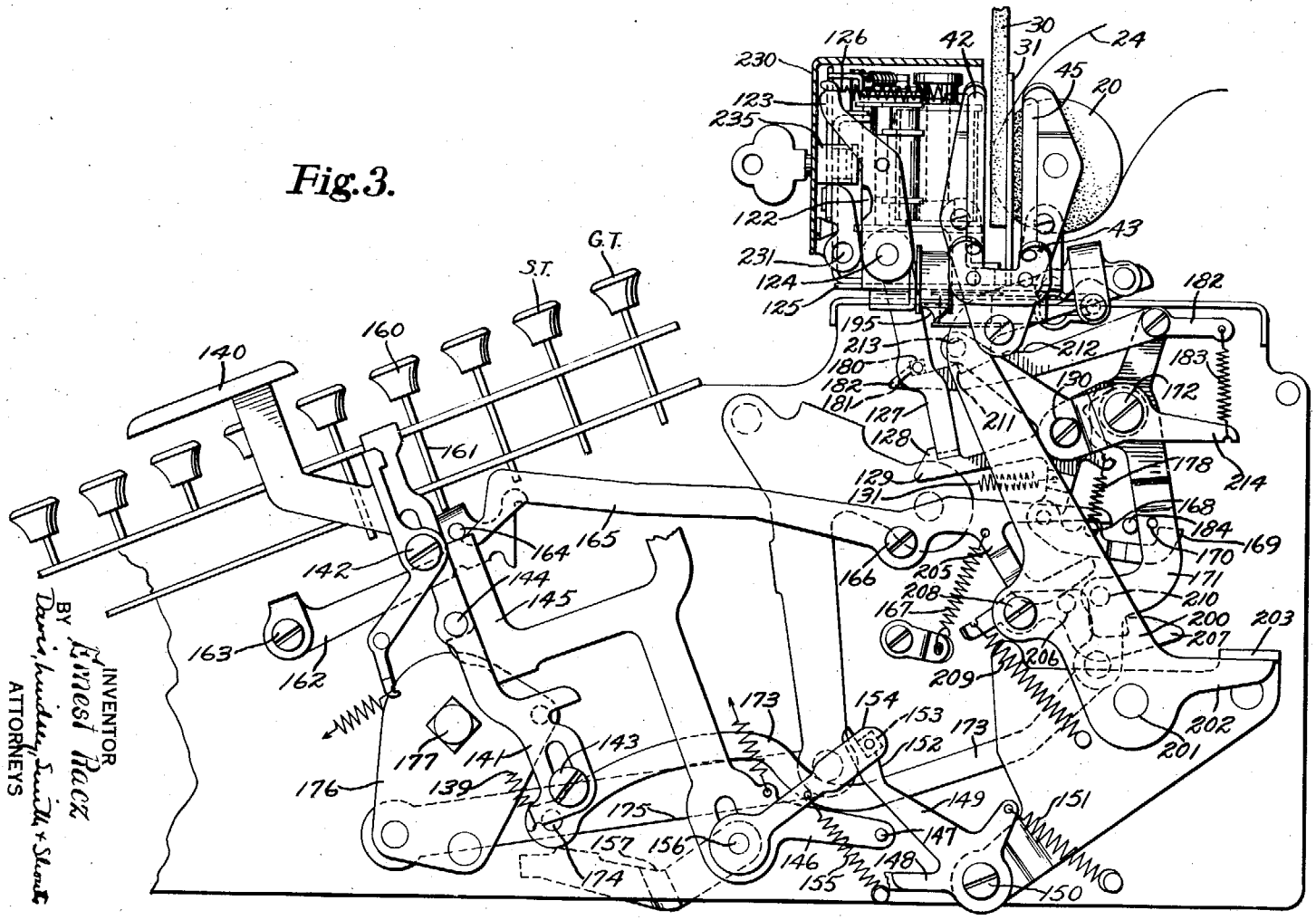

Fig. 3 is a right side elevation of said machine with some of the parts omitted, the view showing more particularity the parts associated with the present invention.

Figures 4, 5:
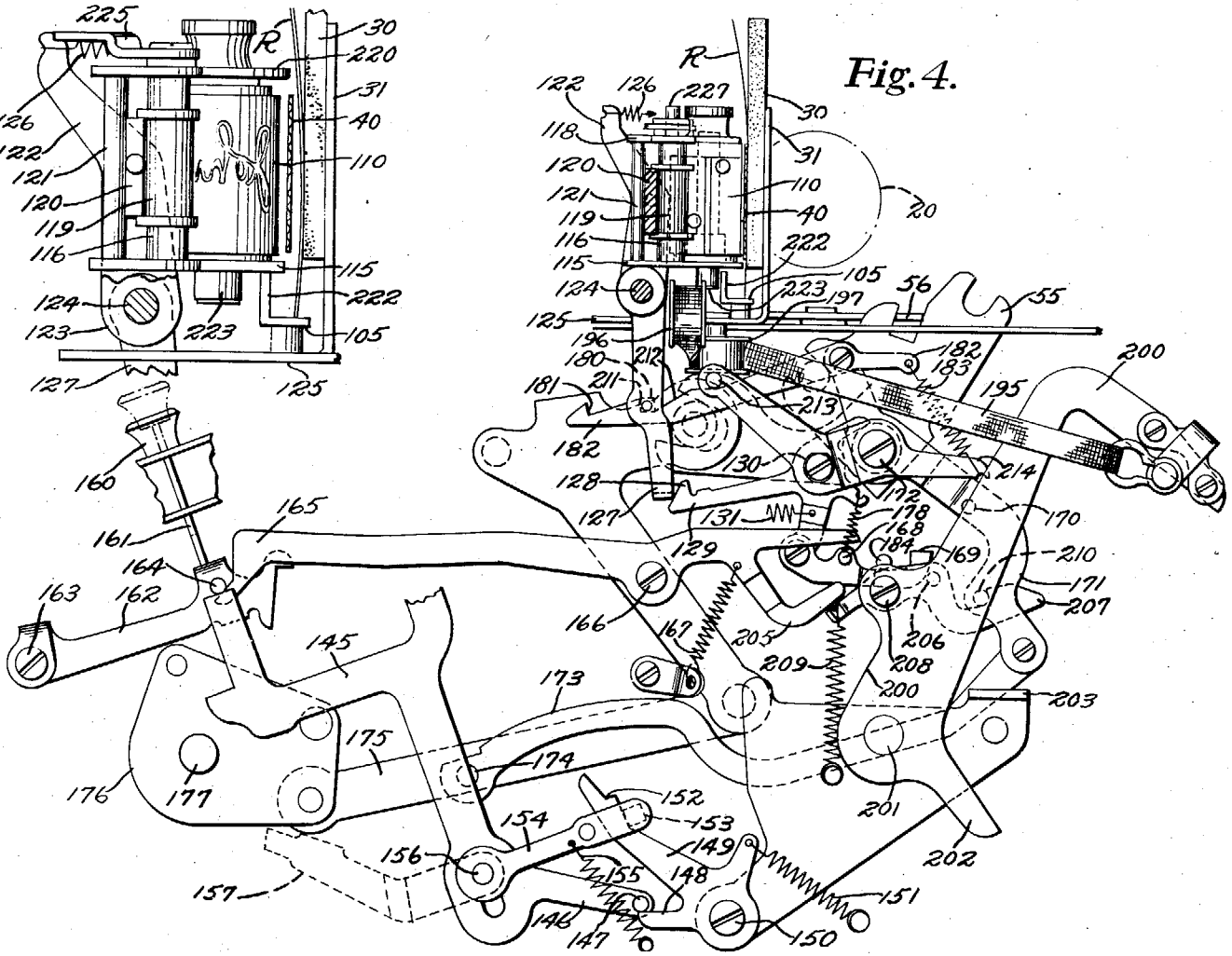

Fig. 4 is a right side elevation of portions of the machine showing the parts in the position they occupy at the end of a half cycle.

Figures 6, 7, 8, 9, 10:
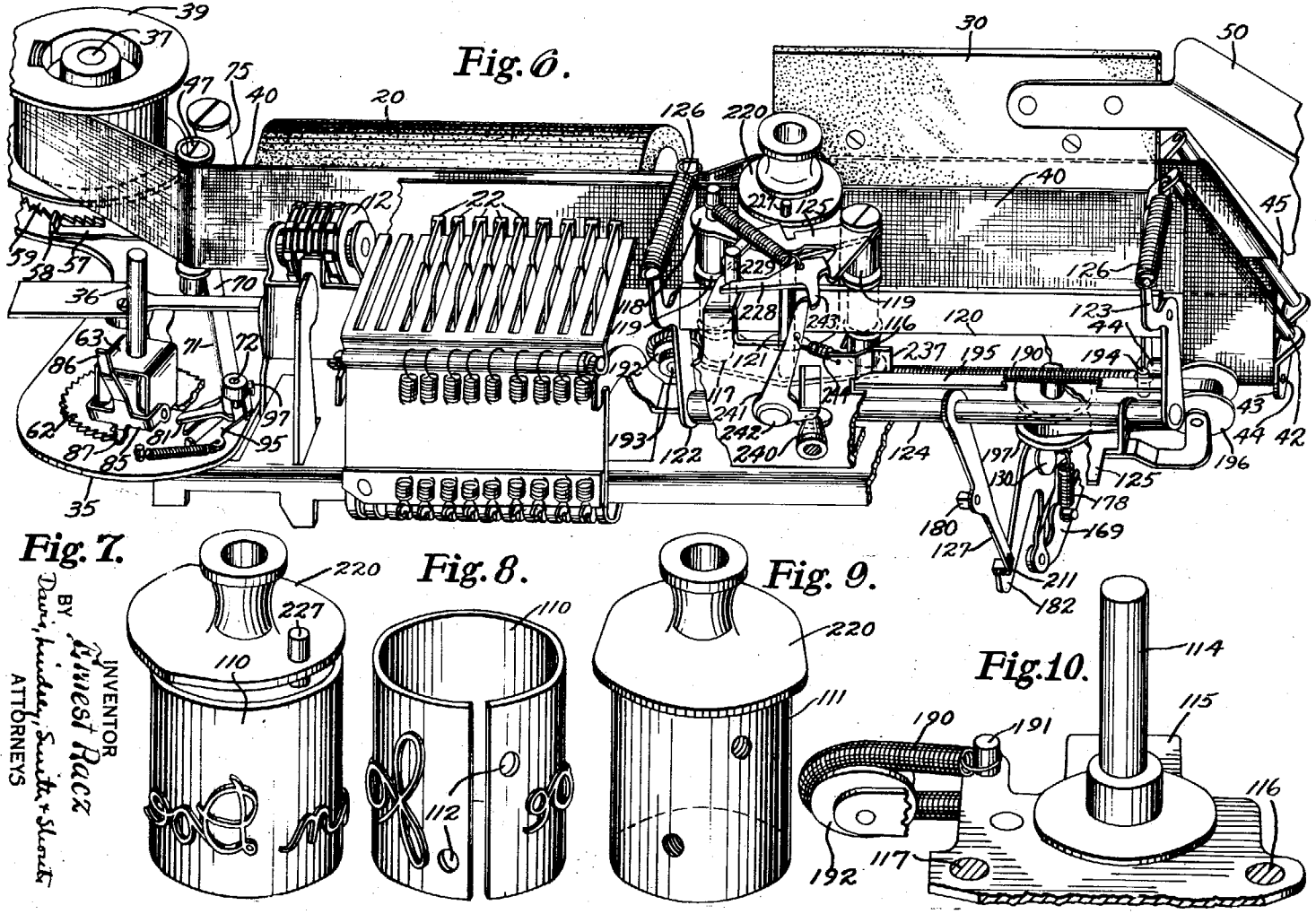
Figure 15:
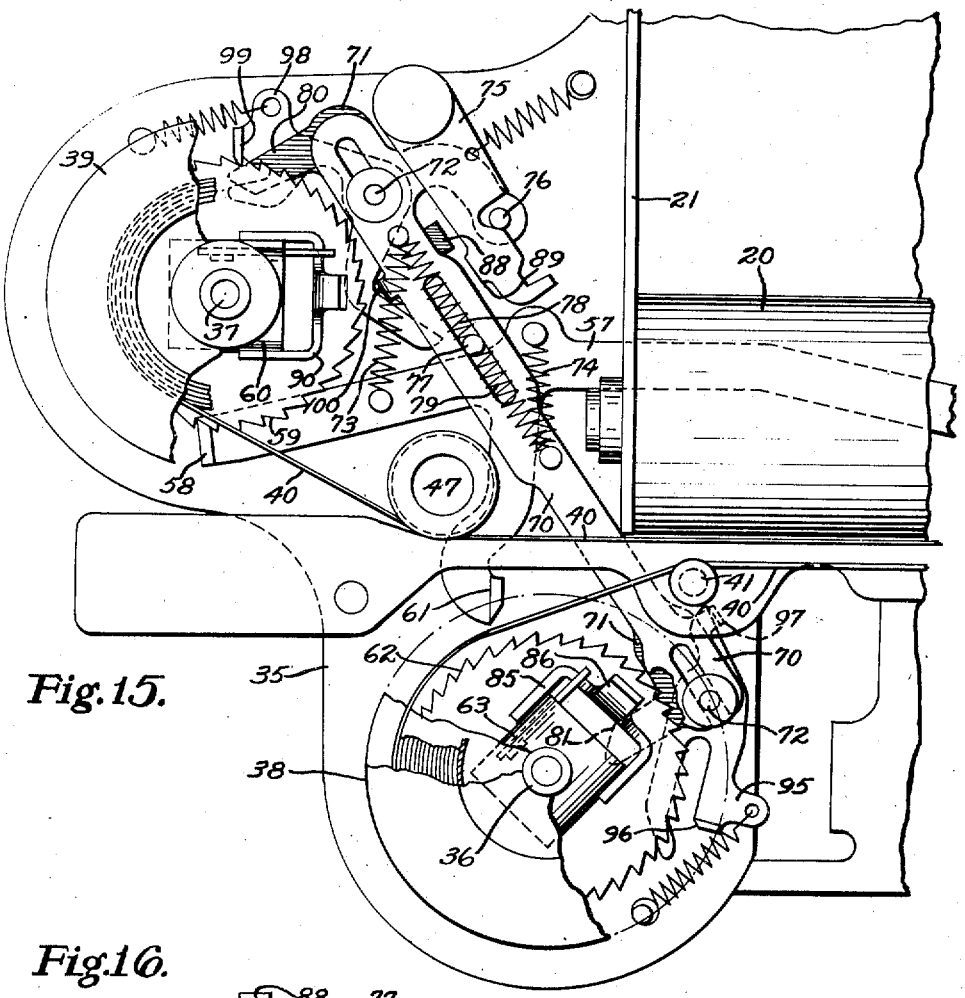

Fig. 5 is an enlarged partial end elevation of the signature printer in its normal position, the view being for the purpose of illustrating the mounting of the signature printer;

Fig. 6 is a partial perspective of the upper portion of the machine showing the parts in normal position;

Figs. 7 to 10, inclusive, are detail views of the signature printing cylinder and its mounting;

Fig. 11 is a partial plan view of the rear portion of the machine showing particularly the parts associated with and comprising the present invention;

Figs. 12, 13 and 14 are partial detail views of the signature printing cylinder showing some of the controls therefor in different positions;

Fig. 15 shows a portion of Fig. 11 on an enlarged scale.

Figure 16:
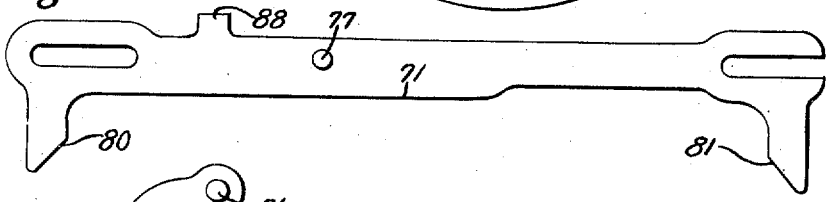
Figure 17:
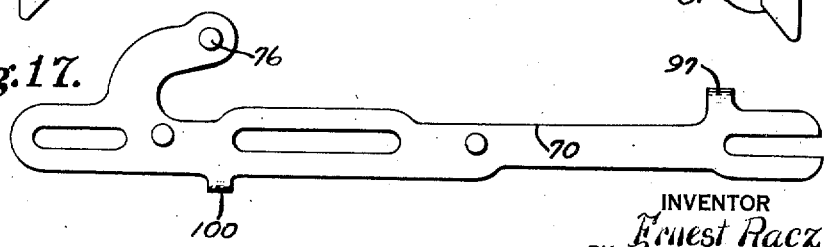

Figs. 16 and 17 are large scale.

Figures 18, 19:
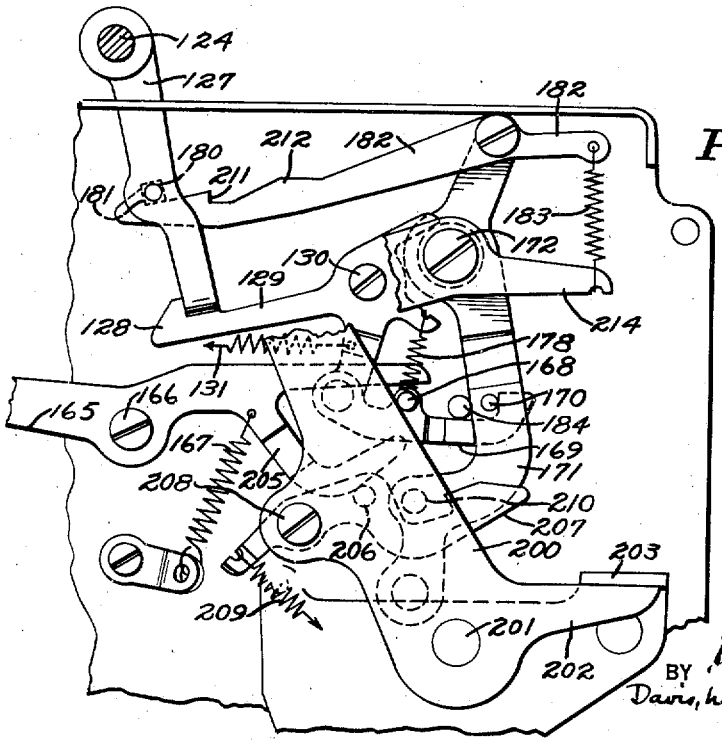

Fig. 18 is a partial right side detail with the controls for the signature printer in condition for operation before the machine is actually operated; and Fig. 19 illustrates three sample forms showing different types of work of which the invention is capable.

*Examples of signature printing work*

The invention will be more easily understood if typical examples of work are first explained, such as illustrated in Fig. 19.

An important use of the machine at present is for receipting tax bills to provide the taxpayer with a legal receipt containing an authorized signature together with the amount collected or paid. The tax collector desires a running record of the collections as well as an accumulation of the amount in a register or totalizer in order that, at the end of the day, he may check his cash with the amount in the totalizer as well as with his running record. It is also important that he be able to insert the receipts in the machine quickly and easily and that the entering of the amounts and the signing of the receipt comprise as few operations as possible because there usually are large numbers of taxpayers waiting in line before the collection window at the time and shortly before payments are due.

While a variety of tax receipt forms are in use, they are generally similar and the three typical forms shown in Fig. 15 will suffice to illustrate the work.

The form at the top of Fig. 19 is the simplest one, being merely a single receipt on which the necessary data and signature are printed. This receipt is inserted in the machine in front of the usual platen in a position such that a portion of it enters the signature printer hereinafter described. The operator then enters the amount of the tax payment ($58.65) on the amounts keys, then depresses a motor bar or key that causes the machine to be given a cycle of operation during which the machine prints the number of the receipt (5231), the date, and the amount ($58.65). These items are not only printed on the recipts but they are printed on a detail strip or record sheet behind the receipt, the second printing being made by a second stretch of ink ribbon, the mounting and control of which will be presently explained. The receipt number is printed by a rotary consecutive number printer such as shown at 12 in Fig 6.

The amount is also entered in one of the totalizers. During the machine cycle, the words "Paid" and "Treasurer" or other desired legends, if any, are printed together with the signature of the officer legally authorized to sign tax receipts. At the end of the operation, the receipt is free to be removed and handed to the taxpayer, the collector's records being on the record sheet and the amount of the payments being entered in the register.

The middle form of Fig. 19 is one in which the receipt is perforated along its center so that it may be separated, one part being handed to the taxpayer and the other kept by the collector. When this form is used, it is inserted so that the items other than the signature will be printed first on the left-hand end or collector's stub. The operator enters the date and the amount of the payment ($100.00) as before and gives the machine a cycle of operation by depressing a special motor key that causes the receipt printer to operate. During the machine cycle the number of the receipt (1234) is printed, along with the date and the amount ($100.00) on the collector's stub. During this same cycle, two signatures are printed on the right-hand end of the receipt if it is necessary for the tax receipt to be signed by two persons in order to be legal. These two signatures are spaced some distance apart so that items may be printed between them. After the first machine cycle, the receipt is moved to the left so as to be in position to enable the consecutive number, the date and the amount to be printed on the right-hand end of the receipt. When this type of form is used, the machine is provided with a repeat print mechanism which is conditioned by depression of a special motor key for the first machine cycle for each receipt so that, at the end of the first machine cycle, the amount keys will not be released. Also, the consecutive numbering mechanism is arranged so that it operates only when the special key or motor bar is depressed. The operator depresses the regular motor bar for the second machine cycle during which the signature printing mechanism does not operate and the consecutive number is not advanced but the machine operates in the usual way otherwise to print the consecutive number, the date and the amount between the two signatures. The register or registers is or are non-added during one of these operations, preferably during the signature printing operation. At the end of the second cycle, the amount keys are released. The platen is not line spaced during the first of these two operations.

The form at the bottom of Fig. 19 is one in which, in order for the receipt to be legal, it must be signed by both the treasurer and the auditor. This form is also perforated along its center so as to provide a collector's stub as well as a taxpayer's receipt. The treasurer first inserts the receipt in his machine and enters the date, the amount of the payment ($65.00). He then depresses a special motor bar which causes the machine to be given a cycle of operation in which are printed not only the date (March 15, 1939) and the amount of payment on the collector's stub but also the treasurer's signature on the receipt, or right-hand end of the form. In this case the machine is not provided with a repeat print mechanism. Consequently, the keys restore at the end of the cycle However, the treasurer moves the bill to the left in his machine and gives the machine another cycle by depressing the regular motor bar which, thereupon, prints the date (March 15, 1939) on the receipt end of the form, the date being printed in the treasurer's machine by a suitable rotary printing device placed in the position of that shown at 12 in Fig. 6. The auditor has a second machine into which he inserts the receipt as received from the treasurer, the auditor's machine being arranged so that the entries he makes are line spaced from those made by the treasurer. The auditor enters the amount of the payment and gives the machine a cycle by depressing a special motor bar which causes his signature to be printed on the receipt end of the form. In the auditor's machine, the rotary printing device of Fig. 6 is used as a consecutive numbering mechanism that prints the number of the receipts (5678) and the amount ($65.00). The amount goes into the register on his machine. The auditor's machine is equipped with the repeat print feature so that the amount keys remain depressed after the first cycle but the registers are non-added by the signature printing motor key and the line-spacing mechanism for the roller platen may be disabled by said key. The auditor then moves the form to the left and gives the machine another cycle by depressing the regular motor bar, whereupon the amount ($65.00) is printed on the receipt end of the form. The auditor then removes the form, tears off the receipt, and hands it to the taxpayer, keeping the stub for his records.

The above are simply typical examples of work, it being possible, of course, to vary the operation to meet the requirements of different collecting offices.

General Construction

Figure 1:
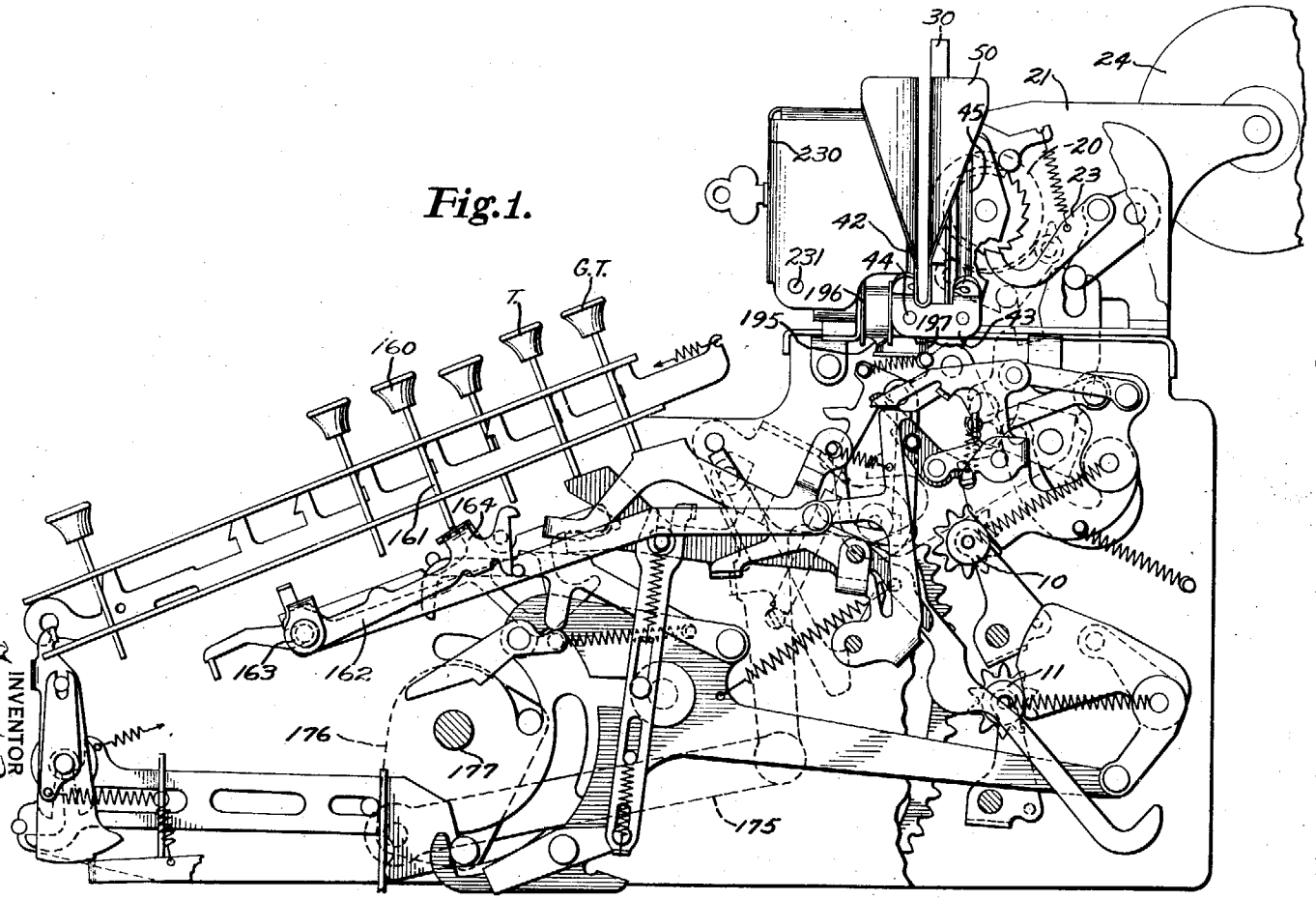
Fig. 1 is a right side elevation of a portable adding machine to which the invention is applied.

The invention is herein illustrated as applied to a Burroughs portable calculating machine illustrated generally in Figs. 1 and 2 and of the general type disclosed in the Allen A. Horton Patent No. 1,853,050, though it is equally applicable to other machines. The illustrated machine is provided with two registers 10 and 11 which are controlled and operated by the mechanism generally illustrated in Fig. 1 so that they are normally both in adding condition but may be placed individually or together in non-add condition under the control of keys on the keyboard. The totals accumulated in the registers may be taken from them under control of the total and total keys T and GT. The amounts set up on the keyboard may be caused to remain set up on the keyboard, through two or more operations of the machine, by a repeat means such as that disclosed in the above-mentioned Horton patent under the control of a selected key or keys or motor bar, the machine also having an electric drive generally similar to that disclosed in the Allen A. Horton Patent No. 2,004,282, but being also adapted to be operated manually when desired, as disclosed in said Horton patent. In the illustrated machine the lower register 11 is controlled similarly to the register 236 of the Horton Patent No. 1,853,050, but the upper register is controlled by means more nearly like the means for controlling the upper register 10 of the Thomas M. Butler Patent No. 2,165,343.

Amounts and other items set up on the keyboard of the machine are printed by a printing mechanism illustrated more particularly in Figs. 2, 6 and 11.

A rotatable platen 20 is carried by supporting plates 21 at the rear of the machine, said platen being positioned immediately to the rear of the type bars 22. A line spacing mechanism of the type shown in Patent No. 1,853,050 to Allen A. Horton and including the line-spacing pawl 23 normally operates to line space the platen during each machine cycle.

A paper strip 24 is passed about the platen from the rear, passing upward in front of the type bars, said strip being held in position by suitable feed rolls in the usual manner.

The machine also has a printing device of the rotary type wheel variety indicated generally by the reference number 12 in Fig. 6, this printing mechanism being suited, when provided with the required type wheels, for the printing of dates or consecutive numbers, suitable means being provided in the latter case for advancing the number type wheels in the necessary manner. In case the rotary printing device 12 is used for consecutive number printing and the higher order type numbers 22 of the regular printing mechanism are to be used for date printing under control of the higher order banks of keys on the keyboard, the latter banks of keys may be controlled by a separate repeat mechanism to keep the desired date set on these keys as long as desired independently of the repeating or nonrepeating of amounts set up on the other banks of keys of the keyboard.

*Signature printer*

The mechanism more particularly concerned with the printing of a signature will be referred to as the "signature printer" or the "signature printing mechanism," although this mechanism does not operate in and of itself but combines with the machine to produce the work heretofore described. The term "signature" is intended to be broad enough to cover various legends no matter whether or not these are classed strictly as signatures.

The signature printer is positioned on the right side of the machine immediately beyond the end of the rotatable platen 20. It includes a flat stationary platen 30 carried by a bracket 31 (Fig. 3) fixed to the frame of the machine. The signature impressions are made by a rotatable, cylindrical signature plate that is rolled across the stationary platen 30, as will be presently described. Only one impression of the signature is made but items, such as check number, date and amount, must be printed both on the receipt or work sheet and upon the record sheet 24 passing about the rotatable platen 20. In order that all impressions may be original ink ribbon impressions, a double ribbon mechanism is provided which positions two stretches of ink ribbon in front of the rotatable platen 20 and one stretch in front of the stationary signature platen 30.

Referring to Figs. 6 and 11, a stationary bracket 35 fixed to the left side of the machine supports two posts 36 and 37 on which two ribbon spools 38 and 39 are rotatably and detachably mounted to permit replacement of the ribbon. The ribbon 40 passes from the spool 38 in Fig. 11, over a stationary guide 41, along the printing line of the rotatable platen 20, in front of the stationary platen 30, and around the guide roller 42 inclined at a substantially forty-five degree angle on a fixed bracket 43, as shown in Figs. 3 and 6. The ribbon then passes downwardly and then rearwardly around a pair of horizontal guide rollers 44 carried by the bracket 43 and upwardly and around another inclined guide roller 45 parallel to the guide roller 42. The ribbon 40 then passes to the left behind the stationary platen 30 and then swings slightly forward over the corner of a housing 46 enclosing the line space mechanism for the rotatable platen 20, from where it again passes along the printing line of the rotatable platen 20 and over a stationary guide 47 to the spool 39.

The two stretches of ribbon are separated from one another in front of the rotatable platen 20 as shown in Fig. 11 and the front stretch of ribbon is normally spaced from the stationary platen 30. Receipts or other work sheets R (Figs. 4 and 5) are guided between the front stretch of ribbon and the stationary platen and thus also into the space between the two stretches of ribbon in front of the rotatable platen by a guide chute 50 supported on the stationary platen 30.

The ribbon 40 is normally fed during each machine cycle but this occurs during the latter half of the cycle instead of during the early part of the cycle as is usual in most calculating machines. Feeding during the first half of the cycle is not desirable because the signature printing cylinder is rolling across the ribbon during the first half of the cycle and a movement of the ribbon at that time would tend to smear the impression. The ribbon feed is operated by means of a lever 55 (Figs. 2, 4 and 11) that is reciprocated during each machine cycle. The upper end of this lever 55 has a slot receiving one arm of a bell crank 56 (Figs. 4 and 11) that in turn is connected to a feeding link or pawl 57 (Figs. 11 and 15). The left-hand end of this link has a lug or tooth 58 which, when the left end of said link is in its rearward position, is adapted to engage the teeth on a ratchet wheel 59 mounted on the post 37 and carrying a bracket 60 on which the ribbon spool 39 rests and to which said spool is detachably coupled. The link 57 has a forward projection that is provided with a lug or tooth 61 which, when the left end of the link is in its forward position, is adapted to engage the teeth on a ratchet wheel 62 carrying the bracket 63 upon which the ribbon spool 38 rests and to which said spool is detachably coupled. During the first half of the machine cycle, the lever 55 (Fig. 11) moves rearward, which rocks the bell crank 56 counterclockwise. This pulls the links 57 to the right, during which movement the active tooth 58 or 61 is pulled over the teeth of the respective ratchet wheel 59 or 62 without causing any rotation of the ratchet wheel. During the latter half of the cycle, the lever 55 returns forward (Fig. 11), thereby rocking the bell crank 56 clockwise and thrusting the link 57 to the left to cause the active tooth 58 or 61 to rotate the respective ratchet wheel 59 or 62 and feed the ribbon. This occurs after the printing mechanisms have operated.

A suitable ribbon feed reversing means is provided including a pair of slides 70 and 71 (Figs.

15–17) mounted on studs 72 on the supporting bracket 35. The upper slide 70 is connected by springs 73 and 74 to the actuating link 57. The slide 70 is shown in its rear position in Fig. 11 where the spring 74 yieldingly holds the link 57 in position to render the tooth 58 effective to operate the ratchet 59. The slide 70 is releasably held in this position by a spring-urged detent 75 engaging a stud 76 on a projection on said slide.

The lower slide 71 has a stud 77 extending upward through a slot in the upper slide 70 and connected to the latter by two springs 78 and 79 which normally hold the stud 77 and lower slide 71 in a middle position relative to the upper slide 70. The lower slide 71 also has lateral arms 80 and 81 extending under the edges of the ratchets 59 and 62.

A pawl 85 (Fig. 6) pivotally mounted on the front spool supporting bracket 63 has an arm 86 extending upwardly within the core of the front spool 38 and resting against the inner coil of ribbon 40 on said spool so that when the winding of the ribbon on the rear spool 39 has proceeded to the point where the last coil of ribbon is being unwound from the front spool 38, the pawl 85 is permitted to rock to pass a downward projection 87 thereon through an aperture in the ratchet 62 so that, before the unwinding of the last coil of ribbon from the spool 38 is completed, the projection 87 engages the arm 81 of the slide 71 and moves the latter forwardly. This tensions the spring 78 and tends to move the upper slide 70 forwardly, but the initial forward movement of the lower slide 71 places an upturned lateral lug 88 on said slide in the path of a projection 89 on the detent 75 so that the latter is prevented from moving to permit movement of the upper side 70 forwardly until the lower slide 71 has moved fully forward and fully tensioned the spring, whereupon the upturned lug 88 on the lower slide 71 clears the projection 89 on the detent 75 and the upper slide 70 is then snapped to its forward position where it is again yieldingly held by the detent. The spring 74 then yieldingly holds the tooth 61 of the link 57 in engagement with the ratchet 62.

When the innermost coil of ribbon is unwinding from the rear spool 39, a pawl 90 like the pawl 85 but pivoted on the supporting bracket 60 for the rear spool 39 engages the rear lateral arm 80 of the lower slide 71 and moves it rearwardly while the lug 88 again temporarily causes the detent 75 to hold the upper slide 70 against movement until the lower slide 71 is in its full rearward position, whereupon the lug 88 releases the detent 75 and the fully tensioned spring 78 snaps the upper slide 70 again into its rearward position where the spring 73 holds the tooth 58 of link 57 yieldingly engaged with the ratchet 59.

A pawl 95 pivoted on the forward stud 72 is spring-urged to engage a tooth 96 thereon with the ratchet 62 to prevent reverse rotation thereof while the tooth 61 of the actuating link is engaged with said ratchet 62 but is cammed to releasing position by a lug 97 on the upper slide 70 when the latter is in its rearward position. Likewise, a pawl 98, pivoted on the rear stud 72, is spring-urged to engage a tooth 99 thereon with the ratchet 59 to prevent reverse rotation of the latter while the tooth 58 of the actuating link is in feeding engagement with the ratchet 59 but also is disengaged from the ratchet 59 when the slide 70 is in its forward position by a lug 100 on the slide 70.

The tax receipt or other work sheet R rests upon a stationary stop 105 (Figs. 4 and 5) that determines its line-space position. During printing operations, the type bars 22, as well as the signature impression device, engage the ribbon and the sheet to press both against the platen, after which the type bars and signature printing device are retracted, leaving the sheet free to be removed. Thus, all the operator has to do is to place the tax receipt or work sheet in the machine, give the machine an operation, and then remove the sheet.

The signature impression device is illustrated in detail in Figs. 7, 8 and 9. It comprises a cylindrical signature plate 110, shown in Fig. 8, having the desired signature or legend formed in relief on it. This plate 110 is detachably secured on a supporting cylinder 111 by means of screws passing through the openings 112. The supporting cylinder 111 is readily removably rotatably mounted on a standard 114 (Fig. 10) fixed on the bottom plate 115 of a slidable carrier. The bottom plate 115 of the carrier supports two studs 116 and 117 (Figs. 6 and 14), projecting upwardly and connected at their tops by a cross-member 118. Rotatably mounted on the studs 116 and 117 are grooved rollers 119 shaped to run on a track or raceway 120. A third stud 121 (Figs. 4 5 and 14) is rotatably mounted in the top and bottom plates 115 and 118 of the carrier to engage the side of the track 120 opposite to that engaged by the roller 119. Thus, the carrier on which the signature plate 110 and supporting cylinder 111 are rotatably mounted is supported by the track 120 on which it may move laterally. However, the carriage will move bodily with the track 120 when the track is moved forwardly and rearwardly of the machine.

The track 120 is rockably supported at its ends in two arms 122 and 123 fixed to a shaft 124 journaled in the frame 125 (Fig. 3) that supports the signature printer. These arms 122 and 123 are urged clockwise in Figs. 4 and 5 by springs 126 which thus urge the track 120, together with the carrier and signature plate 110, toward the platen 30. Normally, however, the parts are held in a position such that the signature plate 110 is spaced from the platen 30 as shown in Fig. 5. For this purpose there is fixed to the shaft 124 a downwardly projecting arm 127 (Figs. 3 and 18) having a lateral lug engaged by a shoulder 128 on a latch 129 pivoted at 130 and urged clockwise by a spring 131. As long as this latch 129 is in the position of Figs. 3 and 18, the signature plate is held in an ineffective position and no impressions will be made from it.

It is not desired to have the signature printer operate when the calculating machine is used for ordinary purposes and, even when used for tax receipting work, it is sometimes desirable to have the signature printer operate only during selected machine cycles. Accordingly, provision is made for control of the signature printer by the operator.

Referring to Fig. 3, the operator may depress a motor bar 140 to cause the machine to perform a cycle of operations without operating the signature printer. The irregularly shaped stem 141 of the motor bar 140 is slidably mounted on fixed studs 142 and 143 and urged upward by a spring 139 (Fig. 3). The motor bar stem has a stud 144 positioned over a forward projection on a slide 145 which has a rearward projection 146 carrying a stud 147 positioned so that when the slide is depressed by depression of the motor bar, the stud engages a projection 148 on a latch 149 pivoted at 150 and urged clockwise by a spring 151. This latch 149 has a shoulder 152 that is normally positioned under a square stud 153 on an arm 154 urged clockwise by a spring 155 and fixed to a shaft 156, which extends to the left-hand side of the machine (Fig. 2) where an arm 157 secured on the left end of said shaft 156 controls a motor switch 158 and clutch 159 in the manner in which a similar arm 60 in the Horton Patent No. 2,004,282 controls a similar clutch and switch. When the motor bar 140 is depressed, the stud 147 rocks the latch 149 counterclockwise, thereby releasing the arm 154 which is moved by its spring 155 to cause the motor to give the machine a cycle of operation.

To cause the motor to give the machine a cycle of operation and to cause the signature printer to print the signature during said cycle of operation, the operator may depress a key 160.

The stem 161 of the key 160 engages an abutment surface on a lever 162 pivoted at 163. This lever 162 carries a stud 164 positioned over an upward projection of the slide 145. Thus, when the key 160 is depressed for the purpose of causing a signature to be printed, the motor is caused to give the machine a cycle of operation.

The stud 164 is also positioned to engage the cam edge of a lever 165 pivoted at 166 and urged clockwise by a spring 167. The upper branch of the forked rear end of this lever 165 is positioned over a stud 168 on a connecting pawl 169 pivoted on a downwardly projecting arm of the latch 129. The connecting pawl 169 has a hooked rear end adapted to engage over a stud 170 on a lever 171 pivoted on a fixed stud 172 on the machine frame. The lever 171 is normally oscillated during each machine cycle by a link 173 connected at 174 to a link 175 that in turn is connected to a plate 176 fixed on the main drive shaft 177 which is rocked counterclockwise and then returns clockwise during each machine cycle.

When the key 160 is depressed to give the machine a cycle, the lever 165 is rocked counterclockwise. This permits the connecting pawl 169 to be rocked counterclockwise by its spring 178 to place its hooked end behind the stud 170 on the lever 171 as shown in Fig. 18. As the machine starts to operate, the plate 176 rocks counterclockwise thrusting the link 173 rearward and rocking the lever 171 counterclockwise. The stud 170 acting through the connecting pawl 169 rocks the latch 129 counterclockwise, thus releasing lower end of the arm 127.

It is not desired to have the signature plate move too suddenly against the platen. For this reason, the arm 127 is provided with a squared stud 180 (Fig. 3) which is engaged by a forward shoulder 181 on a pawl 182 pivoted on the upper end of the lever 171 and urged clockwise to the position of Fig. 3 by a spring 183. Thus, even though the latch 129 is released, the arm 127 cannot immediately move clockwise, but, as the machine starts to operate and the lever 171 is rocked counterclockwise, the pawl 182 is moved forward, thereby permitting the springs 126 to move the arms 122 and 123 and thus move the signature plate against the platen 30. During continuing counterclockwise movement of the lever 171, a fixed stud 184 cams the connecting pawl 169 out of engagement with the stud 170 to permit the spring 178 to return the latch 129 to normal.

After the signature plate 110 has been moved against the platen 30, it is necessary to roll it along the paper on the front of the platen. The carrier is normally held in the position of Figs. 6 and 11 by a spring 190 which is attached at one end to a stud 191 on the carrier, is passed around a pulley 192 rotatable on a fixed stud 193, and is attached at its other end to a fixed stud 194. The carrier is also attached to one end of a tape 195 which passes around pulleys 196 and 197 rotatable on stub shafts carried by the signature printer frame 125 at substantially right angles to each other. This tape is attached at its other end to the rearwardly turned upper end of a lever 200 pivoted at 201 on the side of the machine frame. The spring 192 normally holds the carrier and lever 200 in the positions of Figs. 7 and 3 respectively, where the lever 200 is limited by engagement of a rearward projection 202 on the lower end of the lever with a stationary lug 203. When the lever 200 (Fig. 3) is rocked clockwise, the tape 195 is pulled in a direction to pull the slidable carrier to the right in Figs. 6 and 11. The return of the lever 200 counterclockwise to the position of Fig. 3 permits the spring 192 to return the carrier to the position of Fig. 7.

Since it is not desired to move the slidable carrier along its track during operations of the machine in which signature printing is not desired, the means for effecting this movement of the carrier is also controlled by the key 160. Referring to Fig. 3, the forked rear end of the lever 165 that is rocked counterclockwise upon depression of the key 160 has a lower branch 205 normally engaging a stud 206 on a connecting pawl 207 pivoted at 208 on the lever 200 and urged counterlockwise by a spring 209 but is normally held in the disengaged position of Fig. 3 by the lower branch 205 of the rear end of the lever 165. When the key 160 is depressed to give the machine a signature printing cycle, the lever 165 is rocked counterclockwise, which frees the connecting pawl 207 and the latter is thereupon moved counterclockwise under the urge of its spring 209 to position its hooked rear end in the path of a stud 210 on the lever 171 as shown in Fig. 18. As the machine operates, the lever 171 is rocked counterclockwise as previously described, whereupon the stud 210 picks up the pawl 207 and rocks the lever 200 clockwise to move the slidable carrier to the right in Figs. 6 and 11.

As the slidable carrier moves to the right, the signature printing plate 110 is rolled on the stretch of ribbon 40 in front of the platen 30 to print the signature on the paper R inserted between the platen and said stretch of ribbon, after which the parts must be returned to normal. During the return of the slidable carrier to normal, it is not desired to have another impression of the signature made by the signature plate. Near the end of the first half of the machine cycle, the pawl 182 (Fig. 3) moves to a forward position such that a second shoulder 211 on it is positioned in front of the square stud 180 on the arm 127. During the second half of the machine cycle, and after the signature impression has been made, the lever 171 is rocked clockwise to normal. This pulls the pawl 182 rearward, and the shoulder 211, acting on stud 180, rocks the arm 127 counterclockwise, which rocks the shaft 124, the arms 122 and 123 and the track 120 counterclockwise as seen in Fig. 3 and moves the signature plate 110 away from the platen 30. As the machine near the end of its cycle, the latch 129 snaps to position behind the lug on the end of the arm 127, the key 160 having been released and the lever 165 restored to normal, thereby restoring the connecting pawls 169 and 207 to the normal position of Fig. 3.

As the lever 171 restores clockwise to normal, the stud 210 moves to the left in Fig. 3, permitting the spring 192 to move the slidable carrier to the left in Fig. 3 and pull the tape 195 to move the lever 200 counterclockwise to normal.

The pawl 182 has a cam edge 212 (Fig. 3) adapted to cooperate with a stud 213 on an arm 214 pivoted on the stud 172. The arm 214 is urged counterclockwise by the spring 183 and has an aperture into which the stud 130 projects, said aperture being larger than the stud 130 to permit a limited rocking of the arm 214. During a machine cycle in which the signature printer is operated, and during the return of the lever 171 clockwise toward normal during the latter half of the machine cycle, the cam edge 212 of the pawl 182 engages the stud 213 and, though the parts are so arranged that the spring 183 at this time would tend to cause the pawl 182 to be cammed counterclockwise by the stud 213, the friction of the engagement between the stud 180 and shoulder 211 of the pawl 182 overcomes that effort of the spring 183 and causes the stud 213 to be cammed upwardly until the stud 130 is engaged by the lower edge of the aperture in the arm 214, after which the stud 213 cams the pawl 182 counterclockwise so that the shoulder 211 is disengaged from the stud 180 on the arm 127 slightly after the arm 127 has been relatched by the latch 129.

During a machine cycle in which the signature printer is not operated and the stud 130 is not disengaged from the latch 182 and the arm 127 is not rocked clockwise from its normal position of Fig. 3, the cam edge 212 of the pawl 182 engages the stud 213 before the shoulder 211 can engage the stud 180. Under those circumstances, the tendency of the spring 183 to cause the stud 213 to cam the pawl 182 counterclockwise is unopposed with the result that the pawl 182 is cammed counterclockwise to prevent the shoulder 211 from engaging the stud 180 during the return of the lever 171 to normal in the latter portion of the machine cycle.

The engagement of the signature plate 110 with the ink ribbon 40, work sheet R and platen 30 is governed automatically so that clear impressions will be made without smudges. For example, the cylindrical signature plate 110 may have some blank spaces in it either at the start of the signature, or between names, or because of peculiarities in the signature and it is desirable that the cylindrical surface of the signature plate at these blank spaces should not press the ribbon against the paper. Referring to Figs. 7, 9 and 12–14, the cylindrical support 111 which carries the signature plate 110 has a cam 220 fixed to its top and positioned so as to engage the paper R in front of the platen above the ribbon 40 when the carrier is rocked toward the platen. This cam is irregularly shaped, its shape being determined by the nature of the signature. This cam performs two functions; namely, it holds the signature plate 110 away from the platen 30 when blank spaces on the plate are presented toward the platen, and it acts as a friction drive for rotating the signature plate 110 and its supporting cylinder 111 as the carrier is being moved laterally past the blank spaces in the signature. For example, when the signature plate 110 is first moved against the platen 30, there is normally a blank space on the plate 110 before the start of the signature and no impression should be made at that time. Consequently, a high point of the cam 220 is in position to engage the platen 30 and prevent the signature plate 110 from engaging the ribbon and paper with sufficient force to make a smudge. As the slidable carrier is moved laterally, this cam 220 engaging the paper and platen, causes the plate 110 and support 111 to rotate. As the first portion of the signature is brought around into impression position, the lower edge of the cam comes to position to permit the signature plate 110 to move under the urge of the springs 126 into impression making engagement with the ribbon, paper and platen. If there are any spots in the signature where the signature plate 110 should not engage with sufficient force to make an impression, another high spot is provided on the cam 220 to rock the signature plate and its support away from the platen slightly so that no impression will be made. This frequently occurs between two names in the signature.

The parts are also constructed so that the signature plate 110 and supporting cylinder 111 are self-aligning in order that uniform impressions may be made. As previously mentioned, the track 120 for the slidable carrier is supported by arms 122 and 123 fixed to the shaft 124. The ends of the track are pivotally mounted in these arms so that said carrier may rock relative to said arms. The carrier is normally held in upright position by the engagement of the bottom plate 115 with a projecting portion 222 of the guide 105 (Fig. 5). As the carrier moves laterally, the bottom plate 115 moves off the guide 222, thereby freeing the carrier so that its track 120 can rock in the arms 122 and 123, thus enabling the signature plate 110 to adjust itself to the platen 30. The bottom plate 115 carries a roller stud 223 which, when the signature plate is moved toward the platen, normally is positioned just a slight distance in front of the raised portion 222 of the guide. When a high point of the cam 220 engages the platen 30 it tends to rock the carirer about its pivot in the arms 122 and 123, whereupon the stud 223 engages the guide 222 which thereupon acts as a fulcrum enabling the carrier to be rocked away from the platen by the cam 220. As soon as the lower edge of the cam 220 is reached, the carrier moves toward the platen again, whereupon the raised signature portion engages the platen, the parts being proportioned so that at that time the stud 223 is slightly away from the guide 222.

Provision is also made for insuring that the signature plate 110 is in the correct rotary position at the start of each signature printing operation as well as for keeping it from rotating when it should not rotate. Referring to Figs. 12–14, a latch 225 is pivoted on the carrier and urged clockwise by a spring 226. This latch has a notch normally engaging a stud 227 on the signature plate supporting cylinder 111 as shown in Fig. 14. Thus, when the parts are in normal position and the signature plate 110 is away from the platen, it is latched against rotation. As the cylinder moves toward the platen, a projection 228 on the latch 225 engages a stationary stud 229 on the signature printer frame, thereby causing the latch to rock to release the stud from the notch and free the signature plate 110 for rotation. As the carrier moves laterally, the latch 225 moves with it and the projection 228 on the latch leaves the stud 229 and the latch 225 is moved by its spring 226 to the position of Fig. 13 so that when the signature plate 110 and its supporting cylinder have made a full revolution during the printing of the signature, they are re-latched by re-engagement of the stud 227 in the notch of the latch 225, after which the carrier is rocked away from the platen 30 prior to return of the carrier laterally toward its normal position.

This arrangement also permits the signature plate 110 and its supporting cylinder to be easily placed in correct position when inserted in the machine. When the cylinder has been placed on the shaft 114, the machine may be given an operation during which the signature printer will be operated and the signature plate 110 and cylinder 111 rotated until the stud 227 comes around to engage the shoulder of the latch 225, which then will hold the signature plate in such rotary position until the next signature printing operation.

The signature printer is covered by a casing 230 (Figs. 1, 3 and 11) pivoted at its forward lower right and left corners on studs 231 (Fig. 3) secured in the signature printer frame. The casing 230 has secured thereon a lock 235 by which the casing can be locked in closed position or unlocked and swung to open position to permit removal or insertion of signature plates with their supporting cylinders. The lock has a slide bolt 236 (Fig. 11) which, when the lock is operated by the proper key, is moved into and out of locking position behind a lug 237 on a part fixed on the signature printer frame. When the casing 230 is swung forwardly to open position, a signature printing plate 110 and the supporting cylinder 111 on which it is secured can be inserted over or removed from the shaft 114 provided that the latch 225 is swung forwardly from the position of Fig. 12 to the position of Fig. 6. To effect such rocking of the latch 225, a conical stud 240 (Figs. 6 and 11) carried on the inner side of the casing 230 engages one arm of a bell crank 241 pivoted at 242 on a part fixed on the signature printer frame and having a second arm engaging a forward projection 243 on the latch. When the casing is in closed position, the conical stud 240 holds the bell crank 241 in a position permitting the latch to be moved by its spring 226 to the position of Fig. 14 but when the casing 230 is swung to open position, the taper of the stud 240 permits the bell crank 241 to be rocked clockwise in Fig. 6 by a spring 244 strong enough to cause the bell crank 241 to rock the latch 225 counterclockwise to the position of Fig. 6 against the tension of its spring 226 to permit easy insertion or removal of a signature plate 110 and its supporting cylinder 111.

Summary of Operation

While the operation should be clear from the preceding description, a brief summary may assist in a better understanding.

When the operator desires to receipt a bill or to issue a receipt, he simply inserts the bill or receipt in front of the two platens 20 and 30 and depresses the key 160. This causes a cycle of machine operation that prints the desired figures, such as the number of the receipt, the date, and the amount, and also prints the officer's signature. As the machine starts to cycle, the signature plate 110 and its supporting cylinder 111 are released and move toward the ink ribbon 40, receipt R and platen 30. After this occurs, the slidable carrier is moved laterally and the signature plate is rotated by friction. Near the end of the cycle and after the signature has been printed, the signature plate is moved away from the platen 30 and during the latter half of the cycle the carrier is returned to normal. Also near the end of the half cycle, the other printing impressions are made and the other printing mechanisms are returned to normal. During the second half of the machine cycle, the ink ribbon 40 is advanced and all parts are restored to normal, leaving the receipt R free to be easily removed by the operator.

If the operator or other authorized person having a key desires to remove the signature plate, the cover 230 can be opened and the signature plate taken out of the machine, after which the same or another authorized person may insert another signature plate or the machine may be used as a calculating machine without the possibility of fraudulent receipts being issued. The signature printer does not interfere in any way with the use of the machine for ordinary calculating operations.

The invention is also very advantageously usable in machines for printing and signing checks, in which case the amount printing mechanism of the machine is preferably such as to print safeguard characters to the left of the amounts printed. The printing hammers 26 which impel the type bars 22 against the paper in front of the platen 20 are operated by pawls 25 (Fig. 2). Where no characters are to be printed to the left of the highest order of the amount being printed, all of the pawls 25 have, as usual, long tails which are engaged by lugs on the upper ends of the usual actuator sectors 27 so that when the actuator sectors and the type bars connected thereto are in their normal positions, the pawls 25 are held out of operative relation to the tails of the printing hammers 26, as fully explained in the heretofore mentioned Horton patent. When safeguard characters are substituted for the "0" characters on the higher order type bars 22 of the amount printing mechanism, the tails of the corresponding higher order pawls are shortened, as in the case of the pawl 25[a] of Fig. 2[a], so that these higher order pawls 25[a] will operate their printing hammers regardless of whether the corresponding actuator sectors 27 are in or out of their normal zero positions. Then, when the higher order actuator sectors 27 are in their zero positions, safeguard characters will be printed by corresponding higher order type bars 22.

I claim:

1. In a machine of the class specified, having driving means, a platen, a carrier, means supporting said carrier for movement parallel to and toward and away from said platen, a printing cylinder, means rotatably supporting said printing cylinder on said carrier on an axis substantially parallel to the face of said platen and transverse to the length thereof, spring means urging said carrier toward said platen, latch means for holding said carrier away from said platen, means for operating said latching means to permit movement of said carrier toward said platen, means operated from said driving means for moving said carrier in a printing and in a return stroke lengthwise of said platen, and means operable from said driving means while said carrier is close to the starting point of said return stroke to return said carrier to latched position away from said platen.

2. In a machine of the class specified, having means for driving it through cycles of operation, a platen, a carrier, means supporting said carrier for movement parallel to and toward and away from said platen, a printing cylinder, means rotatably supporting said printing cylinder on said carrier on an axis substantially parallel to the face of said platen and transverse to the length thereof, spring means urging said carrier toward said platen, latch means normally holding said carrier away from said platen, means operable from said driving means during a machine cycle for operating said latching means to permit movement of said carrier toward said platen, means operable from said driving means during said machine cycle and after release of said carrier from said latching means for moving said carrier in a printing and in a return stroke lengthwise of said platen, means operable from said driving means during said machine cycle and during the initial portion of said return stroke of said carrier to return said carrier to latched position away from said platen.

3. In a machine of the class specified, having driving means, printing mechanism comprising a platen, a printing cylinder, a carrier, means readily removably and rotatably supporting said printing cylinder on said carrier, means supporting said carrier for movement toward and from and along said platen, means to move said carrier toward and said cylinder against said platen, manipulative means controlled by said manipulative means and actuated by said driving means to cause said moving means to move said carrier toward and said cylinder against said platen, means actuated by said driving means subsequently to said movement of said carrier toward said platen to move said carrier away from said platen to carry said printing cylinder away from said platen, and means controlled by said manipulative means and actuated from said driving means to move said carrier along said platen between movements of said carrier toward and from said platen.

4. In a machine of the class specified having driving means, a platen, a printing cylinder, a carrier, means readily removably and rotatably supporting said printing cylinder on said carrier, means supporting said carrier for movement toward and from and along said platen, manipulative means, means controlled by said manipulative means and operable from said driving means for moving said carrier toward and from said platen, and means controlled by said manipulative means and operable from said driving means between movements of said carrier toward and from said platen for moving said carrier along said platen.

5. In a machine of the class specified having driving means, a plurality of manipulative means for causing said driving means to drive said machine through cycles of operation, a platen, a printing cylinder, a carrier, means readily removably and rotatably supporting said printing cylinder on said carrier, means supporting said carrier for movement toward and from and along said platen, means controlled by one of said manipulative means and operable from said driving means during a machine cycle initiated by said manipulative means for moving said carrier toward and from said platen, and means controlled by said manipulative means and operable from said driving means between movements of said carrier toward and from said platen in said machine cycle for moving said carrier along said platen.

6. In a machine of the class specified, printing mechanism comprising a platen for supporting record material, a carrier, means supporting said carrier for movement toward and from and along said platen, a printing cylinder rotatably supported on said carrier to be rolled by frictional engagement with record material supported on said platen upon said movement of said carrier along said platen after said movement of said carrier toward said platen, means for moving said carrier toward and from said platen, means for moving said carrier along said platen in one direction after said movement of said carrier toward said platen and returning said carrier along said platen after said movement of said carrier from said platen, means normally latching said printing cylinder in a predetermined rotary position, and means automatically operating said latching means upon said movement of said carrier toward said platen to free said printing cylinder for rotation and releasing said latching means upon subsequent movement of said carrier along said platen to re-latch said printing cylinder at the end of a predetermined rotation thereof prior to movement of said carrier away from said platen and return of said carrier along said platen to normal position.

7. In a machine of the class specified, a printing mechanism comprising a printing plate, a support for said plate, means releasably retaining said plate on said support, a housing movable from a closed position in which it prevents access to a portion of said printing mechanism including said plate to an open position permitting access to said plate, and means operable by movement of said housing to open position for operating said retaining means to release said plate for removal from said support.

8. In a machine of the class specified, a printing mechanism comprising a printing plate, a support for said plate, means releasably retaining said plate on said support, a housing movable from a closed position in which it prevents access to a portion of said printing mechanism including said plate to an open position permitting access to said plate, means operable by movement of said housing to open position for operating said retaining means to release said plate for removal from said support, and key operated locking means for locking said housing in closed position.

9. In a machine of the class described, a first printing mechanism comprising a platen and printing impression means cooperating with said platen, a second printing mechanism comprising a platen and printing impression means co-operating with said platen, a ribbon mechanism comprising means guiding a first stretch of ribbon between the platens and printing impression means of both printing mechanisms and a second stretch of ribbon between said first ribbon stretch and the platen of one of said printing mechanisms and behind the platen of said second printing mechanism, and means for guiding a sheet of record material between said first ribbon stretch and the platen of said second printing mechanism and between the two ribbon stretches in said first printing mechanism.

10. In a machine of the class specified, printing mechanism comprising a platen, a printing cylinder, a carrier, means readily removably and rotatably supporting said printing cylinder on said carrier, means supporting said carrier for movement toward and from and along said platen, means for moving said carrier toward and from said platen to carry said printing cylinder against and from said platen, means for moving said carrier along said platen in one direction transversely to the axis of said cylinder while said cylinder is against said platen and returning said carrier along said platen in the opposite direction while said cylinder is retracted from said platen, normally effective latching means to hold said cylinder in a predetermined rotary position on said carrier, and means to disable said latching means upon movement of said carrier toward said platen and re-enable said latching means, after a portion of said movement of said carrier in said one direction along said platen, to relatch said platen when the latter has been rotated to said predetermined rotary position on said carrier.

11. In a machine of the class specified, printing mechanism comprising a platen, a printing cylinder, a carrier, means readily removably and rotatably supporting said printing cylinder on said carrier, means supporting said carrier for movement toward and from and along said platen, means for moving said carrier toward and from said platen to carry said printing cylinder against and from said platen, means for moving said carrier along said platen in one direction transversely to the axis of said cylinder while said cylinder is against said platen and returning said carrier along said platen in the opposite direction while said cylinder is retracted from said platen, an aligning element on said cylinder, latching means on said carrier and normally engaging said aligning element to hold said cylinder in a predetermined rotary position on said carrier, and a stationary element engaged by said latching means to disengage the latter from said aligning element upon movement of said carrier toward said platen, said latching means being disengaged from said stationary element by movement of said carrier in said one direction along said platen to re-enable said latching means to relatch said cylinder when the latter has been rotated to said predetermined rotary position on said carrier.

12. In a machine of the class specified, having driving means, a platen, a carrier, means supporting said carrier for movement parallel to and movement toward and away from said platen, a printing cylinder, means rotatably supporting said printing cylinder on said carrier for rotation on an axis parallel to said platen, means for moving said carrier toward and away from said platen, means for moving said carrier parallel to said platen transversely to the axis of said cylinder, disconnectible operating connections between said driving means and each of said carrier-moving means, and manipulative means controlling said operating connections.

13. In a machine of the class specified, having means for driving said machine through cycles of operation, a platen, a carrier, means supporting said carrier, said supporting means being movable to move said carrier toward and away from said platen and said carrier being movable on said supporting means parallel to said platen, a printing cylinder, means rotatably supporting said printing cylinder on said carrier for rotation on an axis transverse to the directions of both of said movements of said platen, spring means for moving said supporting means to move said carrier toward said platen, latching means normally holding said supporting means to position said carrier away from said platen, manipulative means, means controlled by said manipulative means to release said latching means, means for reciprocating said carrier parallel to said platen transversely to the axis of said cylinder, disconnectible operating connections controlled by said manipulative means to cause said driving means to operate said carrier-reciprocating means, and means actuated by said driving means after movement of said carrier in one direction by said reciprocating means and prior to substantial return movement of said carrier by said reciprocating means to move said support to latched position.

14. In a machine of the class specified, a platen, a printing cylinder, the cylindrical face of which has circumferentially successive printing and non-printing portions, means readily removably and rotatably supporting said printing cylinder on said carrier, means supporting said carrier for movement toward and from and along said platen, means to move said carrier yieldingly toward and retract it from said platen to carry said printing cylinder against and from said platen, means for moving said carrier along said platen in one direction transversely to the axis of said cylinder while said cylinder is against said platen and returning said carrier along said platen in the opposite direction while said cylinder is retracted from said platen, and means to prevent a non-printing portion of said cylinder from pressing against said platen.

15. In a machine of the class specified, a platen, a printing cylinder, the cylindrical face of which has circumferentially successive printing and non-printing portions, means readily removably and rotatably supporting said printing cylinder on said carrier, means supporting said carrier for movement toward and from and along said platen, means for moving said carrier toward and from said platen to carry said printing cylinder against and from said platen, means for moving said carrier along said platen in one direction transversely to the axis of said cylinder while said cylinder is against said platen and returning said carrier along said platen in the opposite direction while said cylinder is retracted from said platen, and means on an end portion of said cylinder to engage said platen whenever a non-printing portion of said cylinder is presented toward said platen and prevent pressing of said non-printing portion against said platen.

16. In a machine of the class specified having a driving means, a platen member, a printing member, means supporting said members for movement of one against and away from the other and for movement of one of said members parallel to the face of the other, one of said members being rotatably supported by its supporting means, manipulative means, means controlled by said manipulative means and operable by said driving means for moving one of said members against and away from the other member, and means controlled by said manipulative means and operated from said driving means to effect relative movement of one of said members parallel to the face of the other and transversely to the axis of rotation of said rotatable member while said members are positioned against each other.

17. In a machine of the class specified having a driving means, a platen, a printing cylinder, means readily removably and rotatably supporting said cylinder, said cylinder supporting means and platen being mounted on the machine for relative movement between said platen and cylinder against and away from each other and for relative movement between said platen and cylinder parallel to the face of said platen and transversely to the axis of said cylinder, manipulative means, means controlled by said manipulative means and operable from said driving means to effect relative movement between said supporting means and platen to effect relative movement between said cylinder and platen against and away from each other, and means controlled by said manipulative means and operable from said driving means to effect relative movement between said supporting means and platen to effect relative movement between said cylinder and platen parallel to the face of said platen between relative movements of said cylinder and platen against and away from each other.

18. In a machine of the class specified having a driving means, a platen, a printing cylinder, means rotatably supporting said printing cylinder, said supporting means and platen being relatively movably mounted, spring means urging said printing cylinder and platen toward each other, manipulative means, means normally holding said printing cylinder and platen apart and controlled by said manipulative means and operable by said driving means first to permit said spring means to effect relative movement between said printing cylinder and platen toward each other and subsequently to effect relative movement between said cylinder and platen away from each other, and means controlled by said manipulative means and operable from said driving means to effect relative movement between said platen and supporting means transversely to the axis of said cylinder while said printing cylinder and platen are positioned against each other.

19. In a machine of the class specified having a driving means, manipulative means to cause said driving means to drive said machine through cycles of operation, a platen, a printing cylinder, means supporting said printing cylinder, said supporting means and platen being relatively movably mounted, means to effect relative movement between said supporting means and platen to position said printing cylinder and platen against and away from each other, means to effect relative movement between said platen and said supporting means to thereby cause said cylinder to be rolled on said platen while said printing cylinder and platen are positioned against each other, means normally ineffective in machine cycles to operatively connect both of said moving means to said driving means, and further manipulative means to cause said driving means to drive said machine through a cycle of operation and to render said normally ineffective connecting means effective to operatively connect both of said moving means to said driving means.

ERNEST RACZ.